Aug. 18, 1936.  H. J. MURRAY  2,051,386

SELECTIVE SPEED POWER TRANSMISSION

Filed Feb. 4, 1932  2 Sheets—Sheet 1

Howard J. Murray.

Aug. 18, 1936.  H. J. MURRAY  2,051,386
SELECTIVE SPEED POWER TRANSMISSION
Filed Feb. 4, 1932  2 Sheets-Sheet 2

INVENTOR

Patented Aug. 18, 1936

2,051,386

UNITED STATES PATENT OFFICE 2,051,386

SELECTIVE SPEED POWER TRANSMISSION

Howard J. Murray, New York, N. Y.

Application February 4, 1932, Serial No. 590,852

37 Claims. (Cl. 192—.01)

My invention relates in general to a simple control device for affecting the action of clutching elements selectively employed to affect the status of a pair of power transmitting members. One of the general objects of my invention is to provide control elements by means of which a plurality of clutching elements may be selectively actuated wherewith a driving member may be selectively connected to a driven member when the flow of power is in one direction, and also selectively connected by the said clutching means when the flow of power is in the opposite direction.

Another object of my invention is to provide a multiple clutch control organization by means of which certain of the said clutches may be remotely selected to automatically move in one direction in accordance with the speed relations of certain of its elements and thence remotely selected to move in the opposite direction in accordance with certain other speed relations of the said organizations.

Still another object of my invention is to provide selective control means designed to be selectively actuated to move in two directions whereby one power member may be selectively placed in a plurality of driving relations to another power member in accordance with the operative status of the said control device.

A further object of my invention is to provide a selective clutch roller control device for a vehicle selective free-wheeling system by means of which the flow of power supply in one direction will be automatically controlled by the power supply means of the vehicle and the flow of power in the opposite direction will be controlled by the movement of the vehicle.

An additional object of my invention is to provide a selective control means designed to selectively control certain of a plurality of clutches whereby certain of the clutches may become normally operative while certain other of the said clutches remain inoperative.

A still additional object of my invention is to provide power supply control means designed to be selectively actuated by a selective change speed control means whereby the supply of power to a movable vehicle will be affected in desired relation to the operation of the speed change control means.

The present invention also contemplates the employment of means to provide a selective control mechanism and a double acting clutch organization designed so that power may be selectively transmitted in a desired manner from a driving element to a driven element, and in addition from a normally driven element to a normally driving element.

The present invention is a development of the invention disclosed in my U. S. Patent application, Serial #546,483, filed June 24, 1931.

In the operation of the mechanism disclosed in the above noted application, it was found that clutch roller elements would automatically move into an operative position when permitted to do so by the removal of restraining barriers. However, it was also noted that the movement of one set of rollers to an inoperative position was not controlled by barriers and thus not positive and definite in moving to an inoperative status relative to movement of the rollers. It appeared necessary to provide barriers on the opposite sides of each of said clutch rollers so that the clutch rollers could not normally move away from the barriers. Thus, the present invention proposes to provide a frame or guide between which will be positioned clutch roller elements so as to be at all times under definite control as to their movement due to the encircling action of these frames. In addition, the present invention includes means for connecting these frames to a certain control shift rod through the connection with a shift fork such as 30 of Figure 1, and a shiftably mounted control disc such as 26 of Figure 4.

The invention also contemplates the co-operative association of a free-wheeling and bidirectional connection power transmission control mechanism and an associated lever control mechanism whereby the status of the said power transmission mechanism will be selectively varied to secure a plurality of forward and bidirectional drive conditions due to the co-operative action of the said control means.

*Free-wheeling.*—In connection with the featuring of the invention in its applicability to a power transmission device forming a portion of a movable vehicle, the condition wherein the normally driving member is free of the normally driven member when the said normally driven member rotates at a faster speed than the said normally driving member.

*Bidirectional connection.*—The condition wherein the flow of power is from the normally driven member to the normally driving member. This condition will be referred to hereinafter in both the specification and claims as bidirectional connection.

As the invention may be admirably embodied in a speed change mechanism for automobiles, it will be described in connection with same, but it will be readily appreciated that the invention is not so limited, and may be utilized wherever a remotely controlled selective means may be employed to govern the co-operative actuation of clutch elements and driving and driven elements.

In the following description names will be given to parts for convenience of expression, but the names are intended to be as generic in their application to similar parts as the art will permit.

The invention allows numerous physical embodiments and a preferred type is herein illustrated for the purpose of showing an application of the invention, but it is hereby understood that the showings in the drawings are largely diagrammatic merely being sufficient in detail to show applications of the invention.

My invention relates to a selective speed power transmission mechanism including drive and driven members in which I have brought together in a simple and efficient manner, in combination with a plurality of positively controlled clutches, a selective control means in the form of barrier fingers for positively and definitely moving the said over-running clutches to and from operating positions, a mechanically operated control mechanism for quietly effecting desired speed relations between the driving and driven members through the agency of the said clutches and said barrier fingers and a power supply control means.

Among the novelties of my invention are—means for selectively effecting speed relations between driving and driven members without shifting or moving gears or jaw teeth; means to improve and simplify the method of connecting and disconnecting the power members of a transmission; control means for definitely causing the said connection between the said power members; means to provide both selective and automatic reverse driving relations between the said power members; control means to cause clutching elements to provide selective speed changes through the selective operation of certain over-running clutches; means to provide a control means which will selectively place a power transmission mechanism in desired sequence into a free-wheeling status, and thence into a bidirectional drive status.

Figure 1:
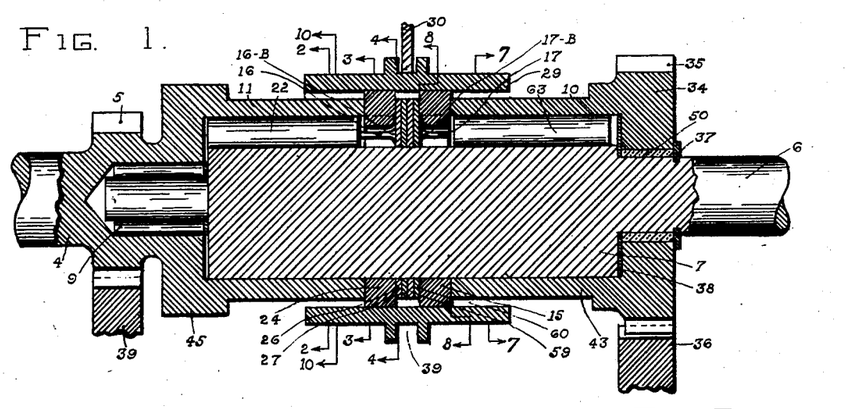
Figure 1 is a fragmentary view of part of a power transmission equipped with a selective control organization, and a double acting clutch means having inventive features as disclosed in this application.

Referring to the drawings, there is shown in Figure 1 a normally driving power shaft 4 connected to a source of power supply, such as an internal combustion engine as commonly found on automotive vehicles (not shown) and a driven shaft 6 hereinafter designated as the normally driven shaft and connected to drive the wheels of the said vehicle. The shafts 4 and 6 preferably are positioned in axial alignment by means of the bearings 9 suitably positioned in the power shaft 4.

For the purpose of this description, the means shown by Figure 1 may be considered as a fragmentary portion of a selective four speed transmission with the parts necessary to effect low and reverse speeds omitted and with various other parts of the inter-lock and counter-shaft omitted in order to simplify the drawings.

The conventional shift lever and associated parts have been omitted in the drawings as well as the means of connecting the shift rods to same in order to simplify the drawings.

In general it may be assumed that the means shown in Figure 1 are primarily for the purpose of selectively placing the transmission in a so-called direct or second speed status. The gear 39 is shown constantly in mesh with the engine gear 5, and the gear 36 is indicated as being constantly in mesh with the loosely mounted power gear 34, and the gears 36 and 39 are assumed for the purpose of this description to be portions of a counter shaft cluster (not shown).

Figures 2, 4:
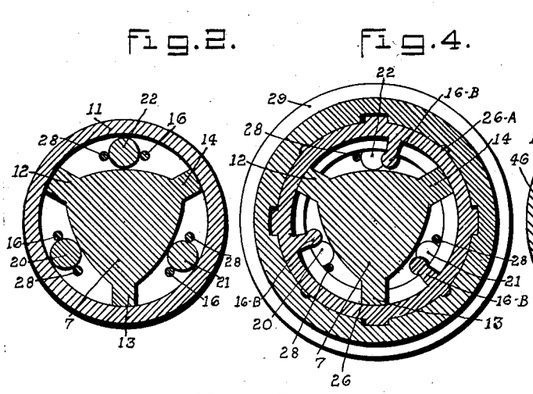
Figure 2 is a transverse sectional view taken along the line 2—2 of Figure 1.
Figure 4 is a view in sectional elevation taken along the line 4—4 of Figure 1, and shows the details of the selective control means as disclosed in this application for selectively controlling the clutches whereby same may be moved selectively in either direction so as to become operative or inoperative.

The normally driven shaft 6 assumed to be connected to the conventional propeller shaft through a conventional universal joint is provided with an enlarged portion 7 preferably ground to suitably support two normally driving members having extending portions 10 and 11 on three radial spoke portions, such as 12, 13 and 14 as shown by Figure 2. The recesses or depressions formed between the said spoke portions are preferably formed in a manner to receive two sets of three over-running clutch roller elements, such as 20, 21 and 22 together to form in effect three separate over-running clutch organizations housed within the outlines of the normal driving flanged portion 11 of the gear 5, and also three separate and distinct sets of over-running clutch organizations such as the elements 63, 64 and 65, similarly housed within the confines of the normal driving flanged portion 10 of the normal driving member 34.

The said clutch rollers may be considered as a plurality of sets of clutching elements, which for the purpose of this disclosure may be of solid steel cylinders designed to selectively engage the inner driving surfaces of the projecting portions 11 and 10 when moved relative to the radially varying surfaces of the enlarged portion 7 of the member 6 so that one may be driven from the other according to the status of the said clutches. It should be noted that the driving gear 5 of Figure 1 is connected to a source of vehicle power such as an internal combustion engine as commonly found on automotive vehicles. These engines are arranged to normally rotate clockwise as viewed from the front of the vehicle. Thus the engine gear 5 will normally rotate clockwise as viewed from the front of the vehicle, or from the left-hand end of Figure 1. The sections of the means shown in sections as Figures 2, 3, 4, 8, 10 and 11 are viewed from the right-hand end of Figure 1. Thus while the driven elements 10 and 11 are normally rotating clockwise with respect to rotation of the engine gear 5 as viewed from the left-hand end of Figure 1, they are also rotating counterclockwise with respect to the sections shown in Figures 2, 3, 4, 8, 10 and 11 as viewed along the direction of the arrows of Figure 1. The following description is applied to the showings in the drawings including Figures 2, 3, 4, 8, 10 and 11 and thus the terms "clockwise" and "counterclockwise" as used in the following description will be understood as applied to the Figures 2, 3, 4, 8, 10 and 11.

Figures 7, 8, 9, 10, 11, 12, 13:
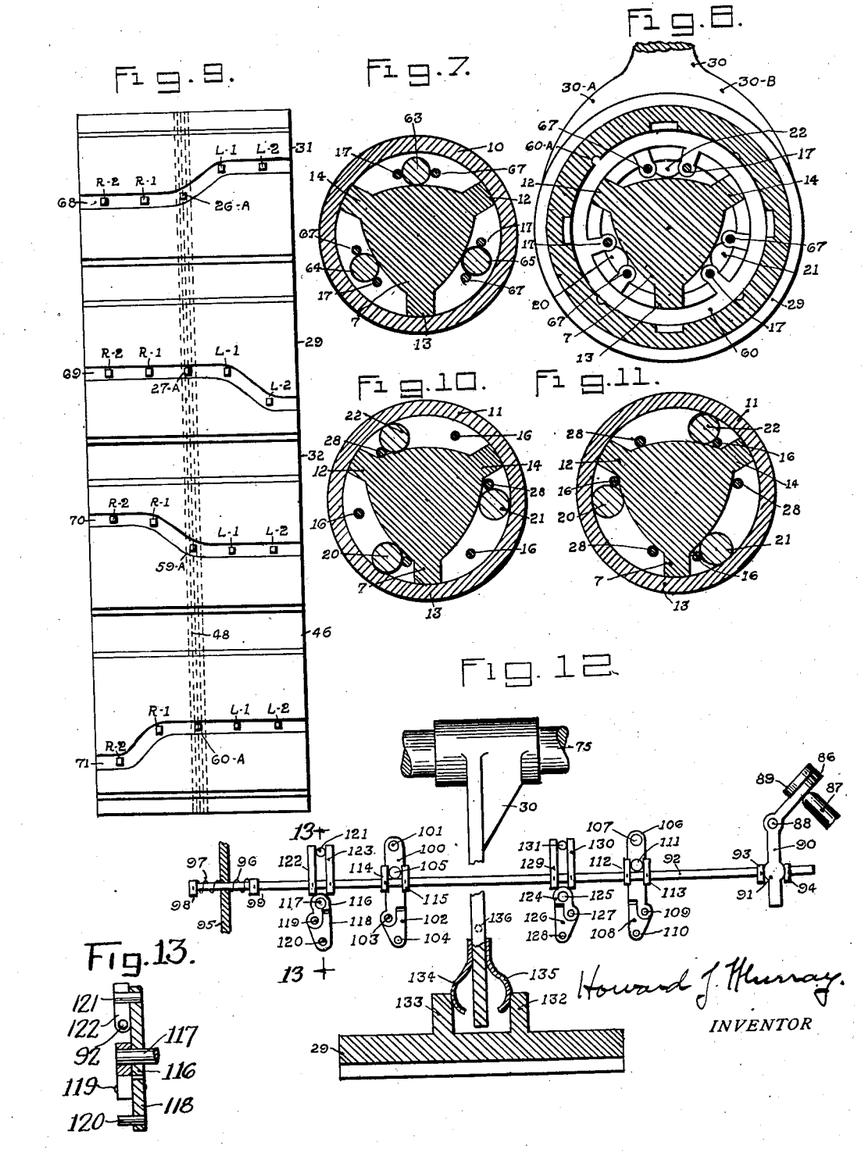
Figure 7 is a transverse sectional view taken along the line 7—7 of Figure 1.
Figure 8 is a transverse sectional view taken along the line 8—8 of Figure 1 in the direction of the arrows.
Figure 9 is a plan view of the inner surface of the axially slidable selector controlled by the shift fork when cut at the top as shown in Figure 4 and opened up counter-clockwise to become flat.
Figure 10 is a transverse sectional view taken along the lines 10—10 of Figure 1 when the clutches have been released by the barriers to move to a clutching position so that the driving member may transmit power to the driven member.
Figure 11 is a transverse sectional view taken along the line 10—10 of Figure 1 and indicates the positions of the barriers and clutch rollers when the normally driven member is permitted to transmit power to the normally driving member when the transmission is in condition for also permitting the clutch to move to either direction.
Figure 12 is a side view in elevation showing the power supply control means in cooperative relation with the change speed control means.
Figure 13 is an enlarged end view partly in sectional elevation of one of the power control elements shown by Figure 12 as taken along the line 13—13 in the direction indicated by the arrows.

It should be further noted that the section shown as Figure 7 is relatively reversed to the section shown in Figures 2, 3, 4, 8, 10 and 11 as will be seen by the direction indicated by the arrows of the line 7—7 of Figure 1. Thus, for example, the clockwise movement of barrier 67 of Figure 7 will be equivalent to a counter-clockwise movement of the same barrier 67 of Figure 8, and the reversal of movement applies to other movable portions shown in Figure 7. The roller clutch elements, such as 20, 21 and 22 may be so employed that the projection 11 of the engine gear 5 may selectively drive the power member 6 in a clockwise or a counter clock-wise direction, and the said rollers may also be selectively employed so that the power member 6 may selectively drive the member 11 in a counter-clockwise direction as viewed from the right hand end of Figure 1 in accordance with the conventional manner of rotating the driven member of transmissions to obtain forward motion of the vehicle. In the same manner, the rollers 63, 64 and 65 of Figure 7 may be so employed that the member 10 of Figure 1 may selectively drive the power member 6 in a counter-clockwise direction, and the rollers 63, 64 and 65 may be selectively employed so that the member 6 will be caused to drive the member 10 in a clockwise or a counter-clockwise direction. It is obvious that the engine speed of shaft 4 must tend to be less than the speed of the shaft 6 in order for power to be transmitted from shaft 6 to shaft 4.

It should be noted that the projecting portion 11 may be integral with the engine gear 5, and that the driving portion 10 is indicated as integral with the loosely mounted gear 34. Thus the portion 11 will rotate at all times with the speed of the engine shaft 4, and the portion 10 will rotate at all times with the gear 34.

All of the rollers, such as 20, 21 and 22 are normally held in the position shown by Figure 2 by a series of holding or restraining barrier fingers, such as 16 and 28. A similar set of barriers such as 17 and 67 as shown by Figure 7, are housed within the confines of the driving member portion 10, to hold or move the rollers 63, 64 and 65 so that the same may be moved positively and definitely clockwise or counter-clockwise.

These barrier fingers in turn are preferably supported by welding same to arms projecting from a disc shaped member as hereinafter described in turn selectively actuated by suitable connection with an axially shiftable control member co-operatively associated with a shift finger designed to be selectively connected to certain of the shift rods forming a part of the transmission control mechanism.

The barrier fingers, such as 16 of Figure 2, are attached to finger like projections 16—B forming portions of a disc shaped control member 26 as shown by Figure 4. This disc shaped control member is preferably made of steel or other suitable material with its inner surface finished to fit in a rotatable manner on the finished outer surfaces of the spoke-like portions 12, 13 and 14 of Figure 2.

The rotatable disc 26 is provided with a radially extending finger 26—A designed to fit into a grooved control track formed by cut-away portions of a splined shiftable member 29 preferably made of steel, and provided with a shift finger slot 39 designed to receive a shift fork 30 preferably made of steel or other suitable material and supported by a shift rod 75 as shown in Figure 12. This shift rod 75 is preferably made of hardened steel and ground to fit slidably within a bore formed within the steel portion 85 constituting a portion of the transmission cover as seen by reference to Figure 5.

Figure 3:
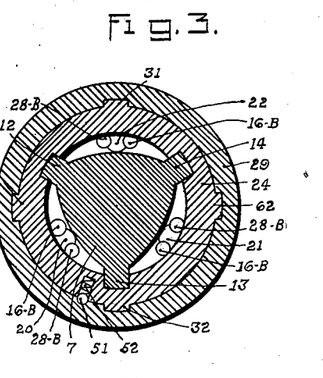
Figure 3 is a transverse sectional view taken along the line 3—3 of Figure 1.

The shiftable member 29 is preferably supported by bearing and positioning members 24 and 15 having projecting splines, such as 31, 32, 46 and 62, and also cut-away portions designed to receive the finished surfaces of the ends of the projecting spokes, such as 12, 13 and 14 as clearly indicated by Figure 3. The inner portions facing the ring like control members such as 26 are bevelled to allow space for the relative rocking movement of the barriers 16, 28, 17 and 67.

Thus, it will be evident that during the assembly of the parts of Figure 1 the said bearing members 24 and 15 may be moved along the portion 7 of the driven member 6 on the outer portion of the projecting spokes until the retaining element, such as the spring backed ball 51, falls into a locking depression due to the pressure of a seating spring, such as the element 52 of Figure 3. Thus the bearing element 24 will therefore be definitely and rigidly positioned with respect to the driving members 10 and 11 forming a portion of the engine shaft 4 and the loosely mounted gear 34 as shown by Figure 1, and hence will rotate in unison with the driven member 6. As the shift finger 30 with its branches 30—A and 30—B is moved axially, it is evident that the said member 29 will also rotate with the shaft 6.

It is evident therefore that the shiftable member 29 splined to the bearing member 24, and the bearing member 24 in turn splined to the shaft 6 will rotate together. As the member 29 is caused to move to the left by pressure of the shift finger branches, such as 30—A and 30—B, the movement of the slidable control member 29 will tend to cause one of the disc shaped control members, such as 26 and 27, to rotate about the axis of the member 6 due to the resultant motion imparted to the control fingers 26—A and 27—A. The method of selectively rotating either of the disc shaped members 59 and 60 will be hereinafter described and may be more clearly seen by reference to the plan view in elevation of the inner surface of element 29 as shown by Figure 9. Thus the plan view of Figure 9 shows the inner plan of the slidable member 29. Figure 9 indicates the necessary depressed tracks for suitably guiding the fingers 26—A and 27—A to cause rocking or rotating of the disc control members 26 and 27. According to the present invention, the grooves for operating the disc members 59 and 60 are oppositely disposed to the tracks or grooves for moving discs 26 and 27 and may be considered similar except that they are relatively reversed to the grooves or tracks as shown in Figure 9.

Figure 5:
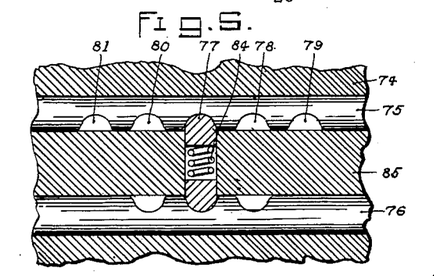
Figure 5 is a sectional view showing the method of interlocking the control rods forming a portion of a power transmission device and indicates the means for obtaining operating positions of the positive control barriers or guides for moving the said clutches.
Figure 6:
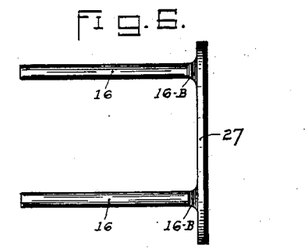
Figure 6 is a side view of one of the barrier control means of Figure 4 to indicate the ring like form of the said control means and the attached extending fingers controlling the clutch elements.

Now the shift rod 75 of Figure 5 to which the shift fork 30 is connected is assumed to be in a neutral position so as to definitely position the shift fork 30 in the normal neutral inoperative position shown in Figure 1. If it is desired to connect the power members 4 and 6 in a direct drive relation, or what is commonly known in the art as direct drive, the shift rod 75 of Figure 5 will be manually or otherwise actuated so as to move the shift finger 30 to the left and thereby the slidable control element 29 connected therewith also to the left.

The control fingers 26—A and 27—A of the disc elements 26 and 27 are in position as shown in the control tracks indicated by the dotted lines 48 of Figure 9. These are the positions the control fingers will assume when the transmission is in a normal neutral condition. When the shift finger 30 is in neutral position, as shown by Figure 1, then the control finger 27—A of control disc 27 is in the position shown and the control finger 26—A of disc element 26 will also be found as shown by Figure 9. The positions R—2, R—1, L—1 and L—2 may now be more clearly defined for future reference as the normal rest positions of fingers 16, 17, 28, and 67 when successively in neutral position, free-wheeling position and bidirectional position. Thus, if the slidable splined member 29 is moved to the left by the shift fork 30, the control fingers 16, 17, 28 and 67 will be relatively moved to the L—1 position of Figure 9. Actually, of course, the slidable member 29 moves and the control fingers are axially stationary.

The finger track or groove 69 is shown as parallel to the slot 68 up to the position L—1 and because of this the finger 27—A will not be moved from its relatively stationary position by the movement of the slidable member 29, and hence the disc 27 connected to the finger will not be rotated about the axis of the driven member 6, nor will the barriers such as 28 be moved or rotated so as to move away from the clutch rollers, such as 20, 21 and 22 of Figure 2. Nor will the barriers be moved or rotated about the axis of the shaft 6 of Figure 1. In this event, these clutch rollers 20, 21 and 22 will not be permitted to move from a neutral or an inoperative position and thus they will not be affected by the relative speeds of the power members 4 and 6 because they are prevented from moving into clutching position with the hub extension portion 11 of the gear 5 due to the retarding action of the barriers 16 and 28.

It should be noted that the grooves 70 and 71 are also parallel to the splines 32 and 46 up to the positions L—1 and therefore the control fingers such as 17 and 67 will not be rotated, nor will the disc control members 59 and 60 be moved.

However, the control finger 26—A is normally positioned at neutral position so that any movement of the slidable member 29 to the left will cause the said control finger 26—A to move along the inclined portion of groove 68 to position L—1 to rotate the said control finger 26—A counter-clock-wise and the disc 26 counter clock-wise with it. In this event, the barriers 16 will also be moved counter clock-wise with the disc 26. Thus the said barriers 16 will be moved counter clock-wise away from the clutch rollers, such as 20, 21 and 22 to permit the same to move relatively counter clock-wise to the surface of the enlarged portion 7 of the driven member 6 so as to cause a driving relation between the power members such as shaft 4 and shaft 6, and thus the transmission will be in the condition of first speed or direct drive so that the normally driving member 4 may transmit power to the normally driven member 6.

If the speed of the driven shaft 6 becomes greater than the speed of the driving shaft 4 then the rollers such as 20, 21 and 22 will automatically disengage from a clutching engagement with the members 4 and 6 and the rollers will be moved toward the barriers 28 to be stopped by the same to create a condition of free-wheeling in the said transmission. It is evident that the transmission status may vary from free-wheeling to direct drive according to the speed relations of the power members, such as 4 and 6.

It should be noted that normally all the barriers such as 16 and 28 are in the positions shown in Figure 2, and thus it is obvious that all of the rollers such as 20, 21 and 22 are inactive and are prevented from becoming active as long as the slidable member 29 is held in neutral position by the shift fork 30.

As the slidable element 29 is moved still further to the left, the control finger 27—A of Figure 9 will relatively move to position L—2 along the inclined portion of the track 69 shown on the plan view of Figure 9 so as to translate the axial movement of the slidable element into a clock-wise rotary motion of the disc control member 27, and thus move the barriers 28 of Figure 2 in a clock-wise direction and thus permit the clutch rollers 20, 21 and 22 to move in a clock-wise direction and thus place the same in a condition to be moved into clutching relation with the power members 4 and 6 to drive one from the other.

Now let it be assumed that the power member 6 is rotating at a faster rate of speed than the power member 4. In this event, the rollers 20, 21 and 22 will be moved to connect the said members in a driving relation whereby the power member 4 will be driven from the power member 6 at the same speed and thus the transmission will be in a direct or high speed reverse drive condition.

It should now be understood that the normal driving power member, such as 4, is conventionally connected to the internal combustion engine placed on the vehicle on which the transmission is installed (not shown). It should be further understood that this connection of the power member 4 to the said engine may be desirably broken by the conventional foot clutch at the will of the operator. In other words, the clutch may be manually operated when desired by the operator of the vehicle to disconnect the power member 4 and thereby also the member 6 from the said engine in the conventional manner.

If the car is in motion and the power member 6 is rotating faster than the power member 4, a coasting power drive condition will exist under the conditions just described because the barriers, such as 16 will permit the clutch rollers 20, 21 and 22 to become active. If the conventional foot clutch is (in) and the engine is accelerated, the member 4 will be increased in its rate of rotation so as to eventually exceed the rate of rotation of the member 6 and thus the member 6 will be driven from the member 4 by the clutch rollers 20, 21 and 22 as hereinbefore described. In this manner power will be transmitted in either direction according to the speed relations of the members 4 and 6.

Thus, I provide a combined free-wheeling and speed changing combination by means of which the power members 4 and 6 may be connected and disconnected as a function of the speed relations of the same.

Now it may be desired to place the transmission mechanism in a condition to drive the engine from the rear axle and thereby to secure the benefit of the engine compression to aid in reducing the momentum of the car and thus reduce the wear on the brakes of the vehicle. In many driving conditions it is considered by those skilled in the art that the vehicle will be under better control when the engine is connected to the rear axle. In any event, I provide means whereby a reverse-drive condition may be effected by the simple act of manually or otherwise selectively releasing the roller barriers, such as 16 and 28 and permitting the rollers to move into a clutching position with members 4 and 6.

It should now be evident that the power member 6 due to its faster rate of motion during the coasting drive intervals will actuate the clutch rollers positively and definitely in a manner known and accepted in the art of over-running clutches so as to thereby cause the same to drive the power member 4 and thus connect the vehicle rear axle to the internal combustion engine employed to actuate the vehicle.

Hence, the operation may be described as follows: The shift finger 30 is attached to the shift rod such as 75 as shown by Figure 5, and therefore moves integral with the same in its reciprocating motion. Hence the rod 75 is therefore moved to the left to the point where the plunger 77 falls into the positioning notch 78. This movement releases the rollers in effect from the restraint of the barriers 16, so that the clutch rollers 20, 21 and 22 are permitted to move into an operating relation with members 4 and 6. During this operation the barriers 28 are not moved. Thus the notch 78 may be designated as the direct-drive free-wheeling notch.

As the shift rod 75 is moved still further to the left so as to release the barriers 28, the plunger will be forced out of the notch 78 and into the notch 79. Thus the notch 79 may be designated as the bidirectional drive notch. In the same manner the rod may be moved from other positions.

Thus with a sequential movement of a single shift finger, such as the member 30, I am able to selectively connect the driving and driven power members, such as 4 and 6, in a plurality of driving conditions. For example, the two members 4 and 6 may be first connected to transmit power from one to the other in a free-wheeling relation. In addition, I am able to use the same control lever in a continued movement to connect the driving and driven power members, such as 4 and 6, in a bidirectional drive relation. Still further, I am also able to use the same lever to selectively place the power members, such as 4 and 6, in a plurality of speed relations as hereinafter described.

If it is desired to return the transmission to a free-wheeling status when in a bidirectional status, the shift finger 30 may be moved to the right from its maximum displacement together with the slidable member 29. In this event, the control finger 27—A will now be rotated counter clockwise due to the action of the track portion 69 formed in the slidable member between the positions L—1 and L—2, and thus the disc control member 26 and consequently the barriers 28 will be moved counter-clockwise, whereby the said barriers 28 will prevent the clutch rollers, such as 20, 21 and 22, from connecting the members 4 and 6, in bidirectional driving relation.

It should be noted in passing that the slidable control member, such as 29, may thus be moved from neutral into the said free-wheeling position without regard to the status of the conventional foot clutch (not shown). If the power member 4 is not driving the member 6 at the instant of the shifting of the slidable member 29 to the left, the barrier fingers, such as 16 may be moved into the releasing position without any appreciable effort. This should be evident because as the slidable member is moved under these conditions, the clutch rollers, such as 20, 21 and 22, are not in a clutching position and thus will not offer any resistance to the movement of the barrier fingers. Thus it will be possible according to the present disclosure to obtain a direct drive speed condition without "throwing out" the conventional foot-clutch.

It is evident then that when the slidable member 29 has been moved to its maximum displacement to the left that a condition of bidirectional power transmission exists between the members 4 and 6 wherein power may be transmitted from one to the other in either direction, and that a free-wheeling condition cannot exist except for the interval that the rollers, such as 20, 21 and 22 are moving between positions of maximum displacement. The total movement of the said rollers in this particular embodiment would be between the positions shown in Figures 10 and 11.

Now let it be assumed that the transmission is in the bidirectional connection status as just described and the operator of the vehicle desires to return to a direct-drive free-wheeling connection status. In this event, the slidable member would be moved to the right, and the shift finger 30 would move the shift rod 75 so that the plunger 77 will be forced out of the notch 79 into the notch 78. The disc control finger 27—A would be moved counter clock-wise because of the relative motion of the inclined portion between the positions L—2 and L—1 in the track 69. Thus, the disc 26 would also be rotated counter clock-wise and likewise the barriers 28 connected to the said disc. It is evident that the return of the barriers 28 to the neutral position would prevent the clutch rollers, such as 20, 21 and 22, from moving into a clutching position with the power members 4 and 6 to permit power being transmitted from the member 6 to the member 4. It is also evident that the rollers 20, 21 and 22, when in a clutching power-transmitting condition, may offer resistance to the movement of the barriers 28 in their return to the neutral position. As this coasting power can only be transmitted when the member 6 is delivering power to the member 4, it is evident that increasing the speed of 4 will act to release the said rollers clutching action. This may be accomplished by increasing the power supply just previous to the movement to the right of the slidable member 29. Means for doing this is shown in a modification of the disclosure as shown by Figure 12.

If the slidable member 29 is now returned to the neutral position as shown in Figure 1, the control finger 27—A will not be affected by the relative movement of the straight track portion between the positions L—1 and neutral, as this portion is parallel to the axis of the disc shaped member 27 of which the control finger 27—A is a portion. The control finger 26—A will, however, be rotated clock-wise due to the effect of the track portion between L—1 and neutral of track 68 to thus rotate the said control finger 26—A and therewith the control disc 26 clock-wise and thus move the barrier fingers 16 back to their original neutral positions and thereby render the clutch rollers 20, 21 and 22 inoperative. This operation of returning the barrier fingers 16 to a neutral inoperative position should normally be accomplished without an apreciable decrease of engine speed.

However, as in the conventional free-wheeling method, the operator may release the fuel control and thus decrease the speed of the engine. This action will release any clutching action between the power members 4 and 6 and the clutch rollers, such as 20, 21 and 22. Thus, the clutch rollers 20, 21 and 22, will then offer no resistance to the neutralizing movement of the barrier fingers 16. In this event, little or no retardation will be offered by the clutch rollers 20, 21 and 22 when pushed back by the barriers to an inoperative or neutral position. Hence, at neutral position both the power members, such as 4 and 6, will be released for free rotation in either direction and the transmission is therefore in a neutral position and no power can be transmitted from the source of power to the rear axle, or from the rear axle to the source of power.

It should now be evident to those skilled in the art that the track or guide portion of the showings of Figure 9 could be modified to effect several combinations of forward drive, free-wheeling and bidirectional-drive conditions without departing from the spirit of the invention.

I shall now explain the operation of the device to obtain second speed, free-wheeling and bidirectional drive.

A loosely mounted power gear, such as 34, is suitably positioned on the shaft 6 by the snap ring, such as 37 or by other suitable means, so as to normally loosely rotate on the said shaft 6 and to normally be driven from the countershaft gear 36 forming a portion of a gear cluster (not shown) including the conventional constant mesh gear 39 constantly in mesh with the engine gear 5.

This loosely mounted gear 34 is provided with jaws or teeth 35 and includes a hub extension portion 10 formed as part of the gear 34 so as to constitute a driving member. The loosely mounted gear 34 may be designated for the purpose of this description as the second speed gear of the transmission mechanism and may be made of steel or other suitable material.

Now if the slidable member 29 be moved from its neutral position, as shown in Figure 1, to the right, then the tracks or guides as shown by Figure 9 disposed on the inside surface of slidable element 29, will cause the control finger 59—A of control disc 59 to be moved counter clock-wise. In this event, the clutch rollers, such as 63, 64 and 65 of Figure 7, will be released by the barrier fingers, such as 67. When the barriers 67 are rotated counter clock-wise, then the clutch rollers 63, 64 and 65 are permitted to move counter clock-wise relative to the curved surface of the portion 7 of the shaft 6.

This operation will cause the source of power on the vehicle to be connected to the rear axle of the said vehicle by means of gear 5, gear 39 and counter shaft (not shown), gear 36, gear 34, power member portion 10, rollers 63, 64 and 65 of Figure 7, and driven power shaft 6.

It should now be obvious that I provide means whereby the operator of the vehicle will be able to selectively place the driving and driven members of the transmission mechanism in a plurality of speed relations by the simple selective movement of relatively light and small portions, such as the slidable member 29, the shift finger 30, disc shaped members 26 and 27, 59 and 60, and the barriers 16, 17, 28 and 67. This selective connection may be made without noise or clash as no jaws or gears are moved into driving relation. In addition, a change of speed relation may be made without necessarily operating the conventional foot clutch (not shown). If no further action is taken by the operator of the vehicle upon which the transmission is installed, a condition will thus be obtained to selectively provide either direct or second speed relations, and at the same time automatically obtain a free-wheeling operation when the power member 6 is driven by the said vehicle. In this particular operation, it should be noted that no power can be transmitted from the power member 6 to the power member 4.

A continued further movement of the slidable member 29 due to pressure from finger 30 to the right will cause the track or guide portions 70 and 71 of Figure 9 to relatively move to the right so as to bring the control finger, such as 59—A and 60—A to the portions R—2 and thus the control finger 60—A will be moved so as to rotate the control disc 60 in a clock-wise motion, and thereby move the barriers 17 away from the rollers 63, 64 and 65 of Figure 7 and thereby permit the said rollers to move into an operative position. Thus, a coasting power drive at second speed conditions will be effected when the car drives the power member 4 of Figure 1 through the rollers 63, 64 and 65 when same have moved into a clutching position. In other words, the removal of barriers 17 will permit the rollers 63, 64 and 65 to move clock-wise or to be moved.

It is evident that a more or less conventional interlock may be employed with slight modifications to insure the holding of the slidable member 29, in any of the said neutral forward driving, free-wheeling and coasting drive conditions, as the said slidable member is moved to the right or to the left to the said certain positions to effect such conditions.

One of these possible interlock modifications is shown by the means indicated by Figure 5. In this combination of means, the shift rod 76 is assumed for the purpose of this particular description to be the low and reverse speed shift rod, and rod 75 the high and second speed shift rod normally employed to move the shift fingers, such as 30—A and 30—B of Figure 8, in either direction as hereinbefore explained. The portion 85 is assumed to be a portion of a conventional transmission cover, and is formed with borings of suitable size to receive the shift rods 75 and 76 to operatively slide therein in two directions. With this interlocking arrangement it should be obvious to those skilled in the art that the slidable member 29 will be held positively in any of a plurality of selective operating positions, and thus the control fingers of the said control discs, such as 26, 27, 59 and 60 will be held in a definite operating position due to their engagement with the cut away track portions 68, 69, 70 and 71 of member 29. In this event, all of the barriers, such as 16, 17, 28 and 67 will be held in fixed operative positions when the interlock is set. According to the present disclosure, I have provided a selective speed changing mechanism which can be desirably operated to effect a plurality of operating relations between the movable members included in the combination and without any restraining springs other than the interlock spring, such as 84 shown in Figure 5.

In the actual operation of the means shown in Figures 1 to 11 it will be found that varying conditions of speed and torque are applied to the power members such as 4 and 6 of Figure 1. It is possible that the operator may desire to change from one speed to another at the instant considerable power is being transmitted from the normally driven member 6 to the normally driving member 4. Under these conditions it may require objectional pressure from the shift finger 30 against the slidable member 29 acting through the discs such as 26, 27, 59 and 60 to release the clutch rollers such as 20, 21, 22, 63, 64 and 65 from clutching engagement with the portion 7 and the tubular portions 10 and 11 of the members 4 and 34.

In addition conditions may be encountered such as when power is being transmitted from the member 4 to the member 6 which would also require considerable pressure to release the said rollers from the said members. For example, one may wish to change from direct drive to second speed while going up a grade. Under this condition power is being transmitted from the member 4 to the member 6. It is, of course, possible to release the conventional clutch as commonly found on self propelled vehicles and thereby cut off the source of power. This would, of course, prevent transmission of power from the member 4 to the member 6 and thereby ensure a release of the rollers. However, the normal operation of the device according to the present invention does not require the operation of the said conventional clutch, altho it may be operated in conjunction with the device if the operator so desires.

By referring to Figure 12 there will be seen a combination of means whereby the release of the clutch rollers from clutching engagement with the power members is ensured under all conditions. There is shown a conventional power supply element 87 assumed to be connected to a conventional power supply (say a carburetor) in the usual manner.

A foot pedal 86 is arranged to rock about the pin 88 and ends in an extension 90 through a rod 92 which is formed to move the pedal, in both directions about the pin 88 by means of the collars 93 and 94. The rod 92 is supported on the other end by the element 95 through which it moves in either direction when the springs 96 and 97 positioned by the collars 98 and 99 are subjected to a proper pressure. Four control elements 116, 100, 124 and 106 are provided and designed to be rotatably supported either above or below the rod such as 92. The element 116 is supported on the pin 117, the element 100 is supported on the pin 101, the element 124 is supported on the pin 125, and the element 106 is supported on the pin 107.

The shift rod such as 75 of Figure 5 is shown supporting the shift fork 30 as it is moved in either direction. A modification of the slidable member 29 of Figure 1 is shown on Figure 12. The slidable member 29 is provided with the shift finger slot 39 considerably widened so as to receive the shift finger and also the springs 134 and 135 attached thereto. In this particular modification the fuel supply control rod, such as 92, is assumed to be mounted so as to reciprocate approximately in the same direction as the slidable member. In this event, the projection 136 attached to the shift finger 30 will be moved to the left with the same and into operating contact with an extension 104 forming a portion of the control element 100 when moved to the position L—1 of Figure 9. As the rod 30 is moved still further to the left, the projection 136 will come into operating contact with the projection 120 forming a portion of the control element 116. But the projection 104 is attached to the hinged portion 102 supported by the pin 103 so as to rotate only in one direction from the position shown. Consequently, the projection 136 will strike the projection 104 and thereby cause the portion 102 to rotate until the projection 104 is raised up and out of the path of the projection 136. Hence, the movement of the shift rod 30 will have no effect on the rod 92 while moving to the left.

In the same manner, a continued movement of the slidable element 29 to the position L—2 will produce no effect on the rod 92 because the projection 120 is also attached to a rotatable portion 118 mounted on the pin 119 so as to rotate in one direction from the position shown on the drawing. Hence, the act of shifting the transmission into a direct-drive, free-wheeling and a direct drive bidirectional status will not affect the position of the rod, such as 92.

When it is desired to return the gear set to a direct drive free-wheeling status the slidable member, such as 29, must be moved to the right from the position L—2 to the position L—1. In this event, the projection 136 will come into operating contact with the projection 120. As the projection 120 cannot rotate about the pin 119 the entire element 116 will now be rotated about the pin 117 to thereby cause the pin 121 attached to and supported by the control element 116 to be pushed against the guides 122 and 123 rigidly secured to the fuel control rod 92. Hence, the fuel rod 92 will be moved to the left as the pin 121 rotates about the axis of the pin 117, and this motion transmitted to the pedal 86 will cause the fuel control element 87 to be moved down to increase the supply of fuel in the usual manner.

As a result, the speed of the normally driving member 4 will be raised above the speed of the driven member 6 (if the conventional clutch is not operated) and hence no power will be transmitted from the member 6 to the member 4. The clutch rollers, such as 20, 21 and 22, will be released and the barriers 16 may be returned to a neutral position without effort. It is evident that the clutch rollers, such as 20, 21 and 22 will be released before the barriers 16 are moved because the spring 135 is already in contact with the flange 132, and if a resistance is offered to the slidable member 29 by the disc 27 the spring 135 will be flattened out so as to allow relative movement between the projection 136 and the projection 120 without moving the slidable member 29. Hence, it is obvious that the speed of the power member 4 will be greater than the speed of the member 6 before it becomes necessary to move the barriers 28.

As the slidable member 29 is moved from the free-wheeling drive to the neutral position or from the position L—1 to neutral on Figure 9 the projection 136 will come into contact with the projection 104. But the portion 102 cannot rotate in this direction about the pin 103 and hence the power control element 100 will be rotated about the pin 101 to the right to move the pin 105 against the guides 114 and 115 rigidly connected to the rod 92. Consequently the rod 92 will be moved to the right and the pedal 86 will be rotated counterclockwise about the support 88 to decrease the supply of power in the usual manner by permitting the element 87 to be raised.

Thus the initial movement of the shift rod 30 will cause the speed of the power member 4 to fall below the speed of the driven power member such as 6. Consequently, the clutch rollers will be released from any clutching relation with the power members 4 and 6 and the barriers 28 may be moved by the rod 30 without effort.

When it is desired to obtain second speed conditions in the transmission the slidable member is moved to the right and thus the projection 136 will move into the path of the projection 128 supported by the hinged portion 126 forming a part of the fuel supply element 124. This portion 126 is supported for rotary motion about the pin 127 only to the right, and consequently it moves to raise the projection 128 up and out of the way of the projection 136, and as a result the movement of the shift finger 30 to the right has no effect on the fuel supply control rod 92. The transmission is now in a second speed free-wheeling status. If it is desired now to place the transmission in a second speed bi-directional drive the shift rod will be moved still further to the right or from the position R—1 to R—2 of Figure 9. Hence, the projection 136 will now be moved into operating contact with the projection 110 forming a portion of the hinged part 108 supported by pin 109 and movable about the said pin to the right from the position shown. Hence, the projection 110 will be raised up and out of the path of the projection 136 and there will be no pressure applied from the finger 30 to the control rod 92.

The transmission is now in a second speed bi-directional drive status and consequently power may be transmitted from the power member 6 to the power member 4. In this event, it may be difficult to break the clutching action between the rollers, such as 63, 64 and 65 and the power members 4 and 6. When the shift rod is moved to the left from the said extreme right position, the shift finger 30 will be moved with it. As a result the projection 136 will strike the projection 110. But the portion 108 cannot rotate to the right about the pin 109 and hence the control element 106 will be rotated about the pin 107 to push the pin 111 against the guides 112 and 113 rigidly attached to the rod 92 and thereby the rod 92 will be moved to the left and the pedal 86 will be rotated clock-wise about the support 89. The element 87 will be pushed down and the fuel supply to the engine will be increased in the conventional manner. This action will occur before the barriers 17 are moved counterclockwise as the declutching of the rollers 63, 64 and 65 will cause a resistance to the movement of the shift finger 30 and consequently the spring 134 will be flattened out and thereby allow advance movement of the rod 30 before the slidable member 29 is moved to the left. Thus, the clutch rollers 63, 64 and 65 will always be released before the barriers are moved, and as a result little or no effort will be required to move the said barriers.

The operator may now desire to return the transmission to a second speed free-wheeling condition and thus will move the shift rod 75 toward the right. But the projection 136 will be moved into contact with the projection 128 forming a portion of the hinged part 126 supported from the pin 127 and only movable to the right from the position shown. Thus the control element 124 will be rotated about the pin 125 so as to push the pin 131 against the guides 129 and 130 rigidly attached to the rod 92 and thereby move the said rod to the right.

Such action will act to shut-off or decrease the power supply and thus cause the speed of the member to be decreased so that the clutch rollers will be automatically released from clutching engagement with the members 4 and 6 and thus the barriers 67 may be easily returned to the neutral position.

It is evident that the normal operation of the vehicle may not require the use of the power control elements, such as 100 and 124 and it is assumed that in many installations they may not be required. However, it is evident that the use of the control elements as shown by Figure 12 will eliminate to a great extent the necessity of the operator exerting physical and mental effort in the operation of the speed changing device.

If the bidirectional drive portion of the disclosure is not used then none of the parts shown by Figure 12 will be required under normal conditions.

It should be still further evident that a vehicle equipped with such a device could be controlled by an operator from a single lever so as to employ free-wheeling or bidirectional drive for various speed conditions at the option of the said operator. In addition, the same shift lever may also be used to effect selective speed changes without meshing gears or jaw clutches. It is within the scope of the present disclosure to apply the means as described to any form of power transmission wherein selective speeds are required in connection with free-wheeling and bidirectional drive.

In addition, it should be noted that it will be possible to leave the car transmission in high or second speed condition on a grade with the slidable member 29 of Figure 1 at maximum displacement in either direction. This is true because any motion of the car will create a bidirectional drive condition, if the engine is dead. If the engine is running, either a reverse drive condition or a normal drive condition will exist, and in either event, a set of the clutch rollers may be caused to connect the power members 4 and 6 so that one may be driven from the other, and thus the engine and rear axle can be positively connected.

While I have shown and have pointed out certain novel features of my invention, it should be obvious to those skilled in the art that various omissions and substitutions in the form and details of the device as illustrated may be employed by those skilled in the art without departing from the spirit of my invention.

Having thus described my invention, I claim:

1. In a combined selective speed-changing, free-wheeling, and bidirectional drive transmission mechanism, a shift rod, a shift finger, a common control means movable axially in two directions by the said shift finger and equipped with a plurality of guides on its inner periphery, a plurality of control disc shaped members each equipped with control fingers designed to move in the said guides thereby to selectively rock the said disc shaped members as the said control means is moved in either of the said directions, a plurality of clutch positioning fingers connected to the said discs, a plurality of groups of over-running clutch rollers co-operatively associated with the said disc fingers and designed to be released by the said fingers thereby to be moved in either of two directions by the relative movement of two power members, means constituting the said power members designed to be selectively driven one from the other in a plurality of speed relations according to the selective action of the said rollers as a result of the said movement, and means for positioning the said shift rod in either of a plurality of operating positions.

2. In a multi-speed power transmission mechanism, a plurality of shift rods, a shift finger, a control means movable axially in either of two directions by the said shift finger and equipped with a plurality of guides on its inner periphery, a plurality of disc shaped control members each equipped with a control finger designed to move in the said guides thereby to selectively rotate the said disc shaped control members as the said control means is moved in either of the said directions, a plurality of over-running roller clutch positioning fingers connected to the said discs to move therewith, a plurality of groups of over-running clutch rollers cooperatively associated with the said fingers thereby to be selectively moved in either of two directions by the relative movement of two power members when free of restraint from the said fingers, means constituting the said power members and designed to be selectively driven one from the other in a plurality of speed relations according to the selective clutching action of the said rollers as a result of the said movement, means for positioning the said shift rods in a plurality of operating positions, means associated with the shift finger and arranged to control the supply of power from one of the said members to the other on the initial movement of the said shift finger whereby the members will be free of a driving relation before the said rollers are returned to an inoperative position by certain of the said fingers and means positioned between the said shift finger and the said control means arranged to permit the clutch rollers to become free before the movement of the said fingers.

3. In a power transmission mechanism, a driving and a driven element, a plurality of over-running clutch means for selectively connecting the said elements in a plurality of speed driving relations when the said driving member is rotating faster than the said driven member and for automatically and positively disconnecting the said driving connections when the driven member rotates at a faster speed than the driving member, and a plurality of restraining means for selectively permitting the operation of the said clutches, said restraining means attached in cooperative groups to rocking members so as to selectively move the said restraining means in two directions so as to selectively permit the said clutch means to become operative when moved in either direction, means constituting the said rocking members formed with control projections designed to be actuated by a common control according to the extent of its movement in either direction along a given axis, and means constituting said common control equipped with control guides arranged to receive the said control projections.

4. In a device of the class described, a driving and a driven element, a plurality of clutching means for selectively connecting the driving element to the driven element in a plurality of speed relations when the driving element is rotating at a faster rate of speed than the said driven member, said clutching means also designed for selectively connecting the driven element to the driving element when the normally driven element is rotating at a faster rate of speed than the normally driving member, certain of said clutching means designed to be automatically and positively disconnected when the said driving member is rotating at a faster rate of speed than the said driven member, a plurality of selectively actuated barriers movable in two directions for selectively permitting the said clutching means to become selectively operative thereby to connect the said driving member to the said driven member in the said speed relations and to also positively disconnect the same, and means constituting selectively actuated elements for selectively actuating the said barriers, said selectively actuated members formed to receive and actuate a certain group of the said barriers designed to control a given speed relation of the said driven and driving elements and to provide a plurality of control fingers actuated by a common control, means constituting the said common control designed with a plurality of guides arranged to receive the said control fingers forming portions of the said selectively actuated members thereby to rock the said actuated members in two directions thereby to move the said barriers in groups to effect the said speed relation, said element, said members, said clutching means, and said common control positioned for movement about a common axis.

5. In a power transmission mechanism, including a plurality of clutching means for selectively effecting speed change elements, means for co-operatively associating the said speed change clutching means and including a plurality of clutch control barriers normally positioned on each side of the said clutching means and designed to effect the action of the said clutching means whereby same will thus be permitted to act to place the power transmission mechanism in a driving relation as a result of a difference in speed of certain of said elements, said barriers designed so as to be selectively operated in two directions by manually controlled elements designed to move the said barriers whereby certain of the said clutching means are inoperative, means for connecting the said barriers to the said manually controlled elements, and a power supply control means designed to be selectively operated by the manually controlled means in advance of the said barrier movement.

6. In a combined selective speed-changing, free-wheeling and bidirectional drive power transmission mechanism, a manually actuated control means movable axially in two directions and equipped with a plurality of guides on its inner periphery, a plurality of disc shaped control members each equipped with sets of control fingers designed to move in the said guides thereby to selectively rotate the said disc shaped members as the said control means is moved in either of the said directions, a plurality of clutch retaining fingers connected to the said discs, a plurality of clutch rollers associated with the said disc fingers and designed to be selectively released by the said fingers to be moved in two directions as the said control discs are selectively rotated, a driven member and a driving member designed to selectively drive or be driven one from the other in a plurality of speed relations according to the selective clutching action of the said rollers as a result of the said clutch movement, and means for positioning the said manually actuated control means in a fixed operating position.

7. In a combined selective speed, free-wheeling and bidirectional power transmission for movable vehicles, driving and driven power elements, a plurality of clutch roller elements designed to be selectively actuated in either of two directions thereby to place the said power elements in a plurality of bidirectional driving relations, a plurality of disc control elements designed to be selectively actuated in either of two directions by a common actuating means thereby to permit the said clutch elements to place the said power elements selectively in a free-wheeling and bidirectional drive relation, a plurality of groups of control fingers attached to the said disc control elements to move therewith in groups so as to selectively actuate the said clutch roller elements, a common actuating means for the said discs equipped with guides for receiving control projections from the said discs and mounted for axial movement in two directions, and means for moving the said common actuating means for causing the said selective actuation of the said clutch elements.

8. In a device of the class described, the combination of two groups of roller clutch elements mounted for rotary motion about a common axis of rotation, each group designed to separately place a pair of power members in a positive drive free-wheeling status and thence in a bidirectional drive status, one of the two said groups arranged to be selectively operative as the other said group is inactive due to the selective restraining tendency of four groups of holding fingers, a plurality of control discs each designed to support and actuate a group of the said holding fingers, a common control means for selectively actuating the said control discs whereby the said holding fingers may be selectively removed from restraining the said roller clutches and thereby permit the said clutches to selectively connect the said power members in the desired driving relation, and means constituting the said power members.

9. In a device of the class described, a group of clutch rollers designed to be selectively released from an inoperative position to be selectively actuated in two relative directions, a second group of clutch rollers also designed to be selectively released from an inoperative position so as to be selectively actuated in two relative directions, a plurality of driving members each formed with a clutch receiving surface and a driven member provided with a plurality of clutch receiving surfaces, two groups of restraining fingers associated with the first named group of clutch rollers, two additional groups of restraining fingers associated with the second named group of clutch rollers, a control disc for each of the said four groups of restraining fingers, said discs mounted about a common axis for rocking movement thereby to selectively rock the said groups of fingers, and a common control means for selectively rocking the said control discs.

10. In a power transmission including a pair of shafts, a plurality of groups of clutch rollers carried by one of the said shafts and each group of clutch rollers individually adapted to selectively establish various drive relations between the said shafts, a shiftable member, a plurality of clutch control members for selectively selecting the said individual group of clutch rollers and designed in turn to be selectively actuated in two directions by the said shiftable member according to the direction and extent of its shiftable motion, means including a movable member for actuating the said shiftable member, and means for effecting a power supply for the said transmission in desired sequence with the shiftable motion of the said shiftable member.

11. In a transmission device, a shift rod, a shift finger, shiftable means movable axially by the said shift finger and formed with guides, a plurality of control members each formed with projections designed to move in the said guides thereby to selectively rotate the said control members as the said shiftable means is moved, a plurality of clutch affecting barriers connected in groups to the said control members, a plurality of groups of clutch rollers co-operatively associated with the said barriers and designed to be released by the said barriers thereby to be moved by the relative movement of two power members, means constituting the said power members, and means for positioning the said shift rod in a desired operating position.

12. In a power transmission including a shiftable control member operatively associated with a fuel supply means and a plurality of clutch means, a plurality of control members designed to be selectively actuated by the movement of the said shiftable member, a plurality of clutch control portions attached to the control members and positioned relative to the said clutch means to permit same to move from an inoperative position whereby an initial movement of the shiftable member will cause certain of the said clutch means to establish a desired driving status in the transmission, and a continued movement of the shiftable member will establish a different driving status in the said transmission, means for moving the said shiftable member and means associated with the shiftable member for freeing the clutches from an operative status whereby they may be moved to an inoperative position, said clutch roller freeing means including a plurality of one-way rockable stop elements connected to the fuel supply means to operate same in advance of the movement of the clutch roller control means so as to increase the fuel supply when moved by the shiftable member in one direction and to decrease the fuel supply when moved by the shiftable member in the opposite direction.

13. In a combined selective speed-changing, free-wheeling, and bidirectional drive transmission mechanism, a shift rod, a shift finger, a common control means movable axially in two directions by the shift finger and equipped with a plurality of guides on its inner periphery, a plurality of control disc shaped members each equipped with control fingers designed to move in the said guides thereby to selectively move the said disc shaped members as the said control means is moved in either of the said directions, a plurality of clutch positioning fingers connected to the said discs, a plurality of groups of clutch rollers co-operatively associated with the said disc fingers and designed to be released by the said fingers thereby to be moved in either of two directions by the relative movement of two power members, means constituting the said power members designed to be selectively driven one from the other in a plurality of speed relations according to the selective action of the said rollers as a result of the said movement, means for positioning the said shift rod in either of a plurality of operating positions, a manually operated fuel supply device, a normally inoperative fuel supply rod operatively connected to the said fuel supply device, a plurality of one-way stop members positioned along the said rod and operatively connected to same, a projection forming a portion of the said shift finger and designed to be intercepted by the said stop members as the said shift finger is moved in either of the two said directions, and resilient means positioned between the said shift finger and said common control means whereby the said shift finger may be moved an appreciable amount before imparting movement to the said common control member.

14. In a device of the class described, the combination of a driving member and a driven member, a plurality of clutching means for placing the said members in a plurality of driving and inoperative relations when the said driving member is moving at a faster rate than the said driving member, a plurality of clutch controlling barriers designed to be selectively actuated thereby to selectively control the action of the said clutch means and thereby to selectively and positively place the said members in the said driving and inoperative relations, said driving and driven members designed to be automatically disconnected from a driving relation when the normally driven member is rotating at a greater speed than the said normally driving member, manually actuated means for selectively operating the said barriers, and fuel supply means operatively associated with the said manually actuated means designed to be actuated upon an initial movement of the said manually actuated means thereby to affect the supply of fuel and thus the power supply and thereby permit the said manually actuated means to easily disconnect the desired clutching means.

15. In a power transmission including a shiftable control member and a plurality of clutch means, a plurality of rotatable members designed to be selectively actuated in two directions by the movement of the said shiftable member, a plurality of clutch control portions attached to the said rotatable members and positioned relative to the said clutch means to permit same to move from an inoperative position whereby an initial movement of the shiftable member will cause certain of the said clutch means to establish a forward-drive free-wheeling status in the transmission, a continued motion of the shiftable member will establish a bidirectional drive status in the said transmission, and power supply control means designed for co-operative association with the shiftable member whereby initial movement of the shiftable member will vary the supply of power to the transmission whereby the clutching means may be easily disconnected by the action of the said shiftable member when moved, and means for moving the said shiftable member.

16. In a power transmission connected to a source of power, including driving elements and a driven element, a plurality of clutching means for causing the said elements to assume a plurality of speed driving relations to transmit power from one to the other, certain of the said clutching elements including associated releasing means designed to selectively permit the said elements to move the said clutching means to place the said elements in one of the said driving relations thereby to permit the transmission of power, certain other clutching means designed to selectively place the said elements in a second speed relation, said associated means designed to selectively permit the said clutching means to connect the said power elements to so be placed in a forward-drive free-wheeling relation and thence in a bidirectional connection relation, manually actuated selective control means for causing the selective actuation of the said associated means, and means for selectively affecting the transmission power supply in advance of the manual operation of the said associated permitting means, said power affecting means cooperatively associated with a single selector, whereby a single movement of the selector will sequentially actuate both said means.

17. In a power transmission, a plurality of power members, a plurality of clutches, a plurality of control fingers, a plurality of finger control members for moving the said fingers, a shiftable control member, and a single selector element, means for operatively associating the above means whereby the said selector may be operated to cause the shiftable member, said finger control members, said control fingers, and said clutches to place the transmission in desired sequence in a free-wheeling direct-drive status, a direct-drive bidirectional status, a direct-drive free-wheeling status, a neutral status, an intermediate speed free-wheeling status, an intermediate bidirectional status and an intermediate free-wheeling status as a complete cycle of driving relations, and power supply means operatively connected to the single selector element designed to affect the supply of power to the said power members whereby the said clutches may be easily moved from an operative position to an inoperative position.

18. In a device of the class described, a normally driven member provided with a plurality of clutching portions, a normally driving organization including a plurality of relatively movable clutching portions encircling the first named clutching portions, a plurality of clutch rollers positioned between each of the said driving and driven clutch portions, a plurality of fingers normally restraining the said clutch rollers from engagement with the associated clutch portions, a plurality of rotatable control elements arranged to support and selectively move the said fingers in groups, a shiftable control element arranged to selectively rotate the control elements singly and in groups as it is shifted, selector means for moving the said shiftable means, and power supply control means actuated on the initial movement of the said selector means whereby the clutching engagement of the said rollers with the said clutch portions will be decreased.

19. In a transmission mechanism, a shift selector, a bidirectional clutch organization including a plurality of groups of bidirectional clutch rollers selectively controlled by the actuation of the selector and a power control means selectively actuated by the selector according to its direction of motion in advance of the selective control of the clutch rollers.

20. In a transmission including a bidirectional free-wheeling clutch organization selector, and power control means operatively associated with the said organization, said organization and said power means designed to be selectively actuated in a sequential manner during continued motion of the said selector.

21. In a power transmission including a selector member, a plurality of clutch rollers arranged to be remotely controlled in their clutching action by the selector member, and a power controlling mechanism designed to be operated by the selector member in advance of the control of the rollers so as to place the transmission in a proper torque status to insure the easy release of the operative rollers from the driving positions by the said selector.

22. In a multi-speed transmission for vehicles, a single control selector, a plurality of sets of bidirectional clutch rollers, and a speed control organization arranged to be operated in advance of the operation of the clutches said selector cooperatively associated with the said rollers and said organization whereby a single required movement of the said selector will selectively actuate the said rollers and said organization in a sequential manner.

23. In a power operated vehicle provided with a source of power including a multi-speed bidirectional transmission of the clutch roller type, manually actuated means for permitting the clutch rollers to effect a desired driving relation, manually actuating means and means associated with the manual means for affecting the vehicle power supply in advance of the said permission in accordance with the extent and direction of motion of the manually actuating means.

24. In a clutch type transmission, means for selectively operating clutch rollers, and means for selectively affecting the supply of power to the transmission in desired relation with the operation of the clutches and a single selector cooperatively associated with the roller operating means and the power affecting means whereby movement of the selector will alternately affect the power supply and the roller operation.

25. In a clutch type transmission including axially fixed driving members and an axially fixed driven member and relatively movable clutch elements, means for selectively operating the movable clutch elements, and power control means for selectively affecting the speed of the driving members of the transmission in advance of the operation of the clutch elements whereby the speed of the driving members will be affected to be automatically above or below the speed of the driven member so as to insure easy operation of the movable clutch elements from an operative position.

26. In a device including axially fixed driving and driven elements, a single selector, movable clutch means for connecting and disconnecting the said elements and power supply elements designed to be operated in desired relation to the said connecting and disconnecting action, said movable means and said power supply control elements cooperatively associated in a sequential manner by the actuation of the said selector.

27. In a clutch type transmission including a plurality of axially fixed power members and a plurality of clutch rollers, means including a single manually operative selector for remotely controlling the operation of the said clutch rollers designed to place the transmission in a plurality of selective speed conditions, a source of power supply and means also actuated by the said selector for affecting the power supply to the transmission as a function of the said speed condition.

28. In a clutch type transmission including axially fixed power members and relatively movable clutch rollers positioned therebetween, means for remotely controlling the operation of the clutch rollers, a source of power and means including a plurality of one-way rockable stop elements having a common support and selectively associated with the remote controlling means for affecting the power supply to the transmission as a preliminary function of the remote control of the said clutching.

29. In a device of the class described, the combination of a plurality of axially fixed driving elements each formed with a cylindrical clutching surface and an axially fixed driven element formed with a plurality of curved surfaces, a plurality of clutch rollers designed to be selectively released to move in either of two directions from a normally restrained position thereby to permit the said elements to cooperate with the roller means to move same to selectively cause a plurality of speed driving relations between the said elements and to disconnect the said driving relations, certain of the said clutch rollers designed to be operative as other of the said clutch rollers are caused to be inoperative, a plurality of clutch roller controlling barriers designed to be selectively actuated to cause the said selective roller release in the two directions and in addition to be actuated to return the said rollers to the restrained position to thereby selectively control the clutching action of the said rollers, a plurality of rockable disc-shaped elements designed to support and selectively actuate groups of the said roller barriers, and a common control means designed to selectively actuate the said disc elements according to the extent and direction of its movement along a given axis.

30. A combination with a power transmission including a pair of axially fixed power members, one of said power members including a plurality of speed driving elements each provided with a cylindrical clutching surface forming a portion of a clutch, the other said power member including a single driving element having a plurality of clutching surfaces each forming an element of a clutch, a plurality of groups of movable clutch portions supported by one of the said members and adapted to move in two directions from a normally restrained position on said supporting member to establish a plurality of drive relations between the said members, and in two directions from operative positions to prevent a plurality of drive relations between the said power member, said movable clutch portions including a plurality of groups of restraining elements arranged to be selectively actuated in a rocking motion in two directions by common manually actuated means whereby certain of the said clutch groups will be released to become operative as other groups are restrained to remain inoperative as a function of the speed relation of the said members, axially movable means constituting the manually actuated selector means, and a power supply control means designed to be selectively operated by the manually actuated selector means according to the direction of movement of the said manually actuated means.

31. In a device of the class described, a plurality of axially fixed driving elements and an axially fixed driven element mounted for rotation about a common axis and axially fixed, selectively movable clutch roller elements positioned between certain of the said elements for permitting same to assume a plurality of driving relations by relatively moving the said roller elements in either of two directions, said clutch roller elements controlled in their movements by the said elements by manually actuated rockable selective holding means thereby to selectively permit the said clutching elements to become operative due to the action of the said driving and driven elements when not restrained by the said holding means, means constituting the rockable means, means for actuating the rockable means, means for connecting the said rockable holding means to the means for selectively actuating same, and means for affecting a power supply device thereby to increase and/or decrease the power supply to the driving elements in desired sequence with the selective operation of the said rockable members.

32. In a power transmission, including an axially shiftable control member and a plurality of clutch roller means, a plurality of rotatable disc members designed to be selectively moved in two directions when actuated by the movement of the said axially shiftable member, a plurality of clutch control portions attached to the said rotatable disc members and positioned relative to the said clutch roller means to permit same to be moved in two directions from an inoperative position to an operative position, whereby a movement will permit certain of the said clutch roller means to cooperate with certain driving and driven elements forming portions of the transmission to establish a forward drive free-wheel status in the transmission and a continued motion of the shiftable member in the same direction will permit the rollers to establish a bidirectional drive status in the said transmission, a single selector for moving the said axially shiftable member, and a power control organization cooperatively associated with the said selector and including a plurality of one-way stop members designed to be actuated according to the extent and direction of motion of the said selector in desired sequence with the actuation of the said clutch control organization.

33. In a device of the class described, a combination of a plurality of driving elements and a driven element mounted for rotation about a common axis and axially fixed about said axis, a plurality of movable clutching means positioned between the said elements and designed for selectively connecting the said elements in a plurality of driving relations and for disconnecting the said driving relations, said clutching means including a plurality of sets of clutch rollers arranged to be moved by the said elements in two directions when selectively released from a normally inactive restrained position and also from operative positions, a plurality of restraining fingers positioned to normally hold the said rollers in the said inoperative position and to move same from operative positions, manually actuated control means axially movable in two directions about a common axis for selectively moving the said restraining fingers and thus releasing the said rollers so as to be moved by certain of the said elements in either of the two said directions and into an operative clutching position as certain other of the said rollers are restrained to remain inoperative, a plurality of disc shaped members positioned about the said common axis and axially fixed to position and support the said restraining fingers, said disc-shaped finger supporting members also provided with control projections designed to be actuated by the movement of the said axially movable control means so as to impart a rocking motion to the said disc-shaped members, interlocking means for positioning the axially movable control means in a desired operating position, and fuel supply control means selectively actuated with the said roller control means in a co-operative manner in advance of the rocking motion of the disc-shaped members for effecting the driving status of the driving and driven elements and therefore the status of the clutching means so that the restraining fingers may easily return same to an inoperative position.

34. In a power transmission mechanism including a plurality of normally driving elements and a normally driven element, a plurality of separated groups of clutch roller means arranged to be moved in two directions from an inoperative position by the said elements for selectively causing the said elements to assume a plurality of driving relations and to be moved in two directions from an operative position for selectively causing a plurality of driving relations to be disconnected, a first named of the said roller groups arranged to be moved in one direction to place certain elements in a direct drive free-wheeling relation as the speed of the driving element exceeds the speed of the driven element, and when moved sequentially in both directions to place the said certain elements in a direct bidirectional drive relation as the speed of one element exceeds the speed of the other element, a second named of the said clutching groups arranged to be moved in one direction by certain other elements to place the said other elements in an intermediate free-wheeling drive relation as the speed of the driving member exceeds the speeds of the driven member and when moved in both directions by the said other elements to place same in an intermediate bidirectional speed drive relation as the speed of one of the other elements exceeds the speed of its co-acting element, a common selectively actuated control means arranged for permitting the elements to cause certain clutching roller groups to become operative as other clutching groups are restrained to remain inoperative, power control means including a plurality of rockable stop elements cooperatively associated with the clutch roller group control means and designed to be sequentially actuated with the common control means by a single selector in advance of the operation of the common control means for affecting the driving action of the driving elements prior to the relative movement of the clutch roller groups, and means constituting the said selector.

35. In a change speed power transmission device for movable vehicles including a plurality of driving members each provided with a clutching surface and a driven member provided with a plurality of clutching surfaces, a plurality of barrier restraining fingers, a plurality of rockable members with projecting fingers for supporting and positioning the barrier fingers, an axially movable common control member provided with tracks for directing the movement of the rockable members through the actuation of the said projecting fingers, a plurality of separately positioned groups of clutch rollers designed for selectively placing the said members in a plurality of free-wheeling driving relation when the said groups are released by the rocking action of the said barriers to become operative due to the relative movement of the said members and in a neutral driving relation when all of the said groups are caused to remain inoperative due to the restraining action of all of the said fingers, said roller groups when released from the said restrained position also arranged to place the said members in a plurality of bidirectional drive relations, and means for axially positioning the said rockable members.

36. In a device of the character described, the combination with driving and driven members, said driven member having a plurality of cammed surfaces, axially disposed gripping members in the form of bidirectional rollers co-operating therewith to act as bidirectional clutches, means in the paths of the rollers to prevent the operation thereof, and axially shiftable means for selectively releasing the said rollers for connecting the driving and driven members in unidirectional and bidirectional drive relations.

37. In a transmission for vehicles including a plurality of groups of remotely controlled bidirectional clutch rollers and a single selector, and a power control means associated with said clutches, said rollers and said power means controlled selectively in sequential manner by the said selector according to the direction and extent of its movement.

HOWARD J. MURRAY.